United States Patent [19]
Aladenize et al.

[11] Patent Number: 5,312,578
[45] Date of Patent: May 17, 1994

[54] METHOD OF MAKING AN INSULATING BODY OF HIGH DIELECTRIC STRENGTH

[75] Inventors: Bernard Aladenize, Epinay Sur Orge; Alain Le Mehaute, Gif Sur Yvette, both of France

[73] Assignee: Alcatel N.V., Amsterdam, Netherlands

[21] Appl. No.: 943,882

[22] Filed: Sep. 11, 1992

[30] Foreign Application Priority Data

Sep. 13, 1991 [FR] France ................ 91 11336

[51] Int. Cl.⁵ .................................. B29C 47/02
[52] U.S. Cl. ................... 264/174; 264/210.2; 264/320; 264/328.12; 264/331.17; 264/349; 425/113
[58] Field of Search .......... 264/174, 236, 347, 331.17, 264/328.12, 349, 320, 210.2; 425/113

[56] References Cited

U.S. PATENT DOCUMENTS

| | | | |
|---|---|---|---|
| 4,078,111 | 3/1978 | Yamaguchi et al. | 264/174 |
| 4,204,086 | 5/1980 | Suzuki | 174/102 R |
| 4,215,086 | 7/1980 | Durakis et al. | 264/174 |
| 4,228,255 | 10/1980 | Fujimoto et al. | 264/211.24 |
| 4,244,910 | 1/1981 | Yui et al. | 264/328.12 |
| 4,276,251 | 6/1981 | Bopp | 264/174 |
| 4,289,716 | 9/1981 | Voigt | 264/209.6 |
| 4,352,701 | 10/1982 | Shimba et al. | 156/51 |
| 4,468,435 | 8/1984 | Shimba et al. | 428/383 |
| 4,996,011 | 2/1991 | Sano et al. | 264/300 |

FOREIGN PATENT DOCUMENTS

| | | | |
|---|---|---|---|
| 3022445 | 12/1981 | Fed. Rep. of Germany | 425/113 |
| 2214162 | 8/1974 | France. | |
| 61-244513 | 10/1986 | Japan | 264/331.17 |
| 4-137318 | 5/1992 | Japan | 264/174 |
| 83167 | 5/1981 | Luxembourg. | |
| 2076419A | 12/1981 | United Kingdom | 264/236 |

OTHER PUBLICATIONS

Cuddihy, Edward F., "A Concept for the Intrinsic Dielectric Strength of Electrical Insulation Materials", *IEEE Transactions on Electrical Insulation*, vol. EI-22, No. 5, Oct. 1987, pp. 573-589.

Primary Examiner—Jeffery Thurlow
Attorney, Agent, or Firm—Robbins, Berliner & Carson

[57] ABSTRACT

The invention concerns an electrically insulating body including at least two polymer materials and a method of making such a body. It is characterized in that its internal structure (61) is mainly formed by a first polymer material and that its surface structure (60, 62) is mainly formed by a second polymer material, said first polymer material having a higher molecular weight than said second polymer material. The proportion in the body of the first polymer material relative to the second polymer material reduces progressively from the internal structure (61) towards the surface structure (60, 62). The invention is applicable especially to insulating electric conductors (26) and enables insulators to be obtained having both a high dielectric strength and a good quality of shape.

11 Claims, 3 Drawing Sheets

METHOD OF MAKING AN INSULATING BODY OF HIGH DIELECTRIC STRENGTH

BACKGROUND OF THE INVENTION

The field of the invention is insulating bodies and more particularly bodies of high dielectric strength and methods for making such bodies.

As is known, the dielectric strength of a material corresponds to the energy necessary to break the internal bonds of the material. Thus, the greater the dielectric strength of a material, the greater the electric field required to break the internal bonds of the material.

In the case of a material which is to be subjected to an electric field, two parameters are determinative: the local electric field, which depends on the average applied field, the geometry of the material in the electric field and the possible presence of inhomogeneities (impurities, voids, etc.) increasing the field locally; the bond energy of the molecular bonds of the material. The weakest bonds may be broken by application of the electric field and degradation of the material then results.

In the case of materials based on polymers, the weakest bonds are the Van der Waals bonds between the molecules of the polymers. The energy of these bonds depends essentially on the distance between the molecules. The greater the distance, the less the energy.

In polyethylene for example, dielectric breakdowns occur mainly in the amorphous regions, i.e. those outside the crystalline structure, when the cohesion of the material is weakest, whereas the crystalline regions are better able to resist, thanks to their smaller intermolecular distance.

Thus the dielectric strength of a polymer, that is to say the ability to withstand electric fields, increases with the organization of the polymer structure and with reduction in the distance between the molecules, these two factors being related.

Materials with high dielectric strength can thus be obtained when their manufacture is effected by drawing the materials. This explanation is to be found in particular in the technical journal IEEE Trans. EI No. 22 (5) p. 573, 1987.

The manufacture of polymers takes place either in the molten state or at a temperature above the glass transition temperature, at which molecular movement occurs. The characteristics of the end product depend on the method of manufacture, in particular on the strength of strains applied to the molten polymer. The stresses applied to the polymer organize the structure of the final product and can be of two types: shearing and extension. For each type of stress the resulting local strain is related to the ratio between the stress and the viscosity of the polymer:

$$GV = C/V \quad (1)$$

where
GV is the velocity gradient between two points of the polymer.
C is the applied stress.
V is the viscosity of the polymer.

Thus, for a given applied stress, the organization of the polymer is inversely proportional to its viscosity. High dielectric strength of the material is thus obtained when its viscosity is low. Conversely, a high viscosity of the material leads to a low dielectric strength of the polymer.

However, in the case of manufacture of the material by extrusion, for example in making the insulation of an electric cable, the overall viscosity of the material at the temperature of manufacture should be high enough to avoid significant deformation of the insulator during the cooling phase of the cable. Thus, as shown in FIG. 1, showing a cross-section of an electric cable emerging from an extrusion machine sheathing an electric conductor 10, also known as an extruder, the polymer 11 insulating the conductor 10 has a tendency to flow in the direction 12 by reason of gravitational force, when the polymer does not have high enough viscosity. The result is that the conductor 10 is eccentric relative to the insulator 11 and the quality of shape of the extruded object is no longer preserved.

It is therefore not known to make products with high dielectric strengths based on polymers by extrusion, since there is a contradiction between a high dielectric value of the object, requiring low viscosity, and a quality of shape of the extruded object, requiring a high viscosity.

The object of the present invention is in particular to provide a method of making such extruded products which reduces this problem.

More especially, it is an object of the invention to provide a method whereby polymer products can be made so as to exhibit both a good quality of shape and a high dielectric strength.

Another object of the invention is to provide such products which both exhibit good geometrical properties and a high dielectric strength.

SUMMARY OF THE INVENTION

These objects, as well as others which will appear below, are met by an electrically insulating body comprising at least two polymer materials, the body being characterized in that the internal structure of the body is mainly formed by a first polymer material and that the surface structure of the body is mainly formed by a second polymer material, the first polymer material having a higher molecular weight than the second polymer material, the proportion in the body of the first polymer material relative to the second polymer material reducing progressively from the internal structure towards the surface structure.

The internal structure corresponds to the core of the body and the surface structure to that of the body at its outer parts.

A molecular weight gradient thus results in the electrically insulating body. It is noted that, since the melt flow index of a material increases as its molecular weight decreases, and vice versa, the body of the invention can equally be defined as exhibiting a surface structure whose melt flow index is greater than that of the internal structure, the body exhibiting a reduction in the melt flow index from the surface structure towards the internal structure. A result of this kind can be obtained by mixing at least two polymer materials with different molecular weights.

The ratio between the highest melt flow index and the lowest melt flow index is advantageously from 3 to 100, preferably from 10 to 30.

In a preferred embodiment, the body of the invention takes the form of a tube extruded on to an electric conductor.

An electric insulator is thus obtained and the proportions of the polymer material are such that the average melt flow index is from 0.05 to 5, preferably from 0.2 to 2.

According to another embodiment, the body of the invention takes the form of a sheet, serving for example as an electric insulator between two electrodes. Such a sheet can be obtained in particular by injection and, in this case, the proportions of the polymer material are such that the average melt flow index is from 5 to 8.

In a preferred embodiment, the polymer materials are of the same kind, being constituted by polyethylene for example.

The invention also concerns a method of making such a body; this method can consist of:
mixing the polymer materials;
heating the material resulting from the mixture of the polymer materials;
applying a stress to the resultant material in such a manner as to organize it.

The purpose of the organization is to allow a non-homogeneous redistribution of the polymer materials, in order to obtain a molecular weight gradient in the body thus obtained.

The method may equally consist of:
making a synthetic material having at least two peaks of different molecular concentrations;
heating the synthetic material;
applying a stress to the synthetic material in such a manner as to organize it.

Such a synthetic material may for example be obtained by chemical synthesis, by modifying the kinetics of polymerization of a given monomer by timed introduction of an additive. Another monomer with a different melt flow index is thus obtained. In this way a material having two peaks of molecular weight is obtained.

The stresses referred to can be applied to the material by compressing it in an extrusion die, the material being shaped around an electric conductor to be insulated. This manner of implementation corresponds to the manufacture of an electric cable.

The stresses may equally consist in molding the material, by injection or otherwise, in a mould.

Other characteristics and advantages of the invention will appear from a reading of the following description of preferred embodiments, given by way of non-limiting example, and of the accompanying drawings, in which:

DETAILED DESCRIPTION OF THE INVENTION

Figure 1:
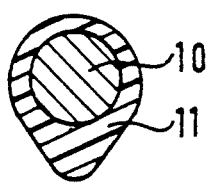
FIG. 1 is a transverse section of a known cable insulated with too fluid a polymer during the extrusion.

FIG. 1 has been described in connection with the state of the art.

Figure 2:
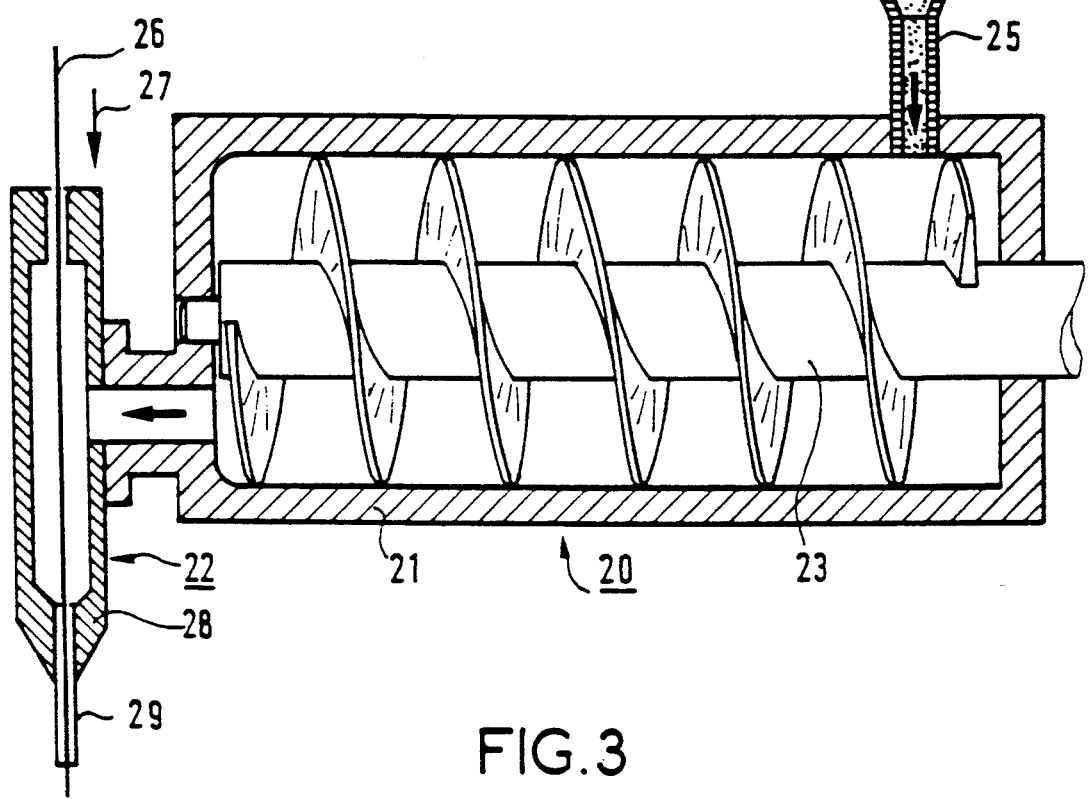
FIG. 2 is a schematic illustration of the manufacture of a polymer insulator for covering an electric conductor.

In order to deal with the deformation of the insulator, the present invention proposes to make an insulating polymer material by the method illustrated in FIG. 2.

FIG. 2 shows schematically the manufacture of a polymer insulator for an electric conductor.

An extruder 20 is formed by an extruder body 21 and an extrusion head 22. The body 21 comprises an auger feed screw 23 for feeding polymer material 24 in an inlet member 25 under pressure towards the head 22. The body 21 also comprises heating means for heating the material 24 and adapted to bring this polymer material to a temperature such that it is in a molten state in the head 22 of the extruder 20. An electrically conducting wire 26 passes through the head 22 of the extruder in a direction perpendicular to the auger feed screw 22. The wire 26 is drawn through the head 22 in a direction 27 by a capstan, not shown. The head 22 is formed by an extrusion die 28, whose outlet end for the wire 26 has a constriction. The wire 26 leaves the die 28 covered in an insulating sheath 29. The insulated conductor is then cooled progressively, for example by passing through water baths at decreasing temperatures.

Figure 3:
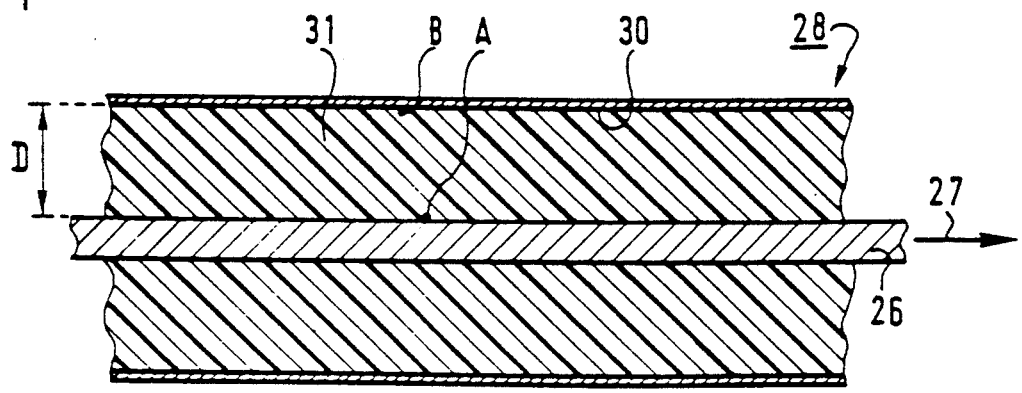
FIG. 3 is a section of the extrusion die of FIG. 2.

FIG. 3 shows a partial section of the die 28.

The extrusion die 28 gives the insulator a standard form around the conductor 26. At the outlet of the die 28, the conductor 26 is thus covered by an insulating sheath. The conductor 26 passes through the die 28 at a certain speed and the interior 31 of the die 28 is filled with molten insulating material under pressure. The speed of the insulating material at a point A immediately adjacent the conductor 26 is equal to that of the conductor 26. On the contrary, because of the viscosity of the material in the die 28, there is adhesion of this material to the internal surface 30 of the die 28 and the speed of the fluid material at any point B at this surface is zero.

Figure 4:
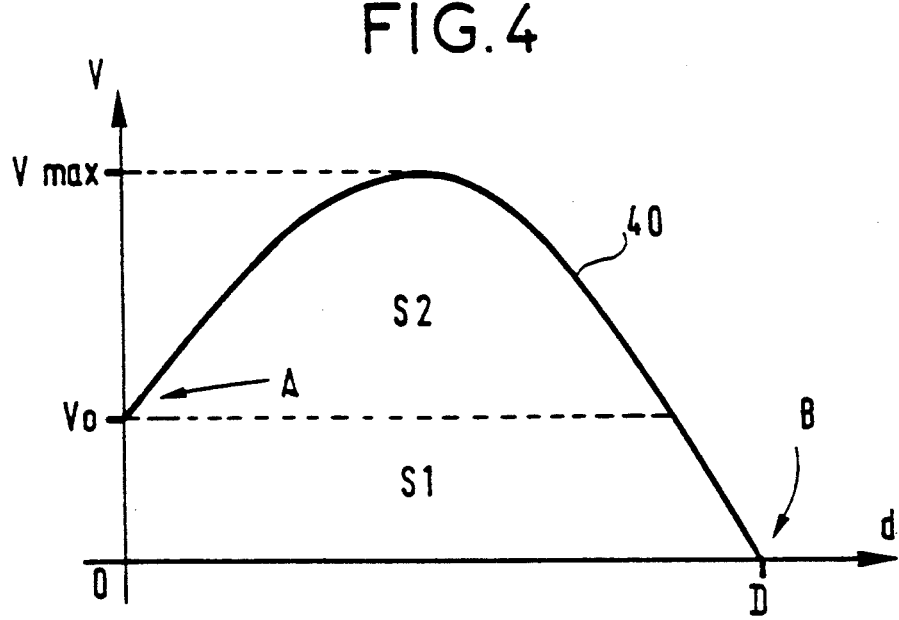
FIG. 4 shows the variation in the speed of an insulator in a die as a function of distance from a conductor which is to be sheathed in this insulator.

The graph 40 of FIG. 4 shows the plot of the speed of the insulator as a function of distance from the electric conductor 26. This distance has a maximum value equal to D (FIG. 3).

The conductor 26 is drawn at a speed Vo and the fluid insulator in contact with the conductor 26 thus also has this speed Vo (point A). Calculations show that the speed of the insulator increases up to a maximum value Vmax before decreasing to zero (point B).

The physical system corresponding to the die naturally has a tendency to compensate for these speed gradients and approximately S1=S2, where S1 and S2 are the areas bounded by the curve 40 below and above the speed Vo of the conductor. The speed gradients lead to shearing of the material under pressure in accordance with equation (1). The difference in speed between two points of the material thus determines the dielectric properties of the material, i.e. the orientation of the molecules.

The present invention exploits this physical characteristic arising from movement of a body in a fluid medium.

In accordance with the invention, the material 24 (FIG. 2) fed into the extruder is a mixture of at least two polymers with different molecular weights. In the case of a mixture of two polymers, one of these polymers has a high molecular weight compared with that of the other polymer. It can equally be said that one of the polymers has a melt flow index less than that of the other polymer.

The mixture of polymers, after being heated, is admitted to the extrusion die 28. The compensation of the speed gradients then allows the material with a low viscosity to locate where the speed gradient is high and the material with a high viscosity to locate where the speed gradient is low.

As in the case of conventional manufacture of insulators, a cross-linking agent may be added to the mixture 24 of the two polymers.

Figure 5:
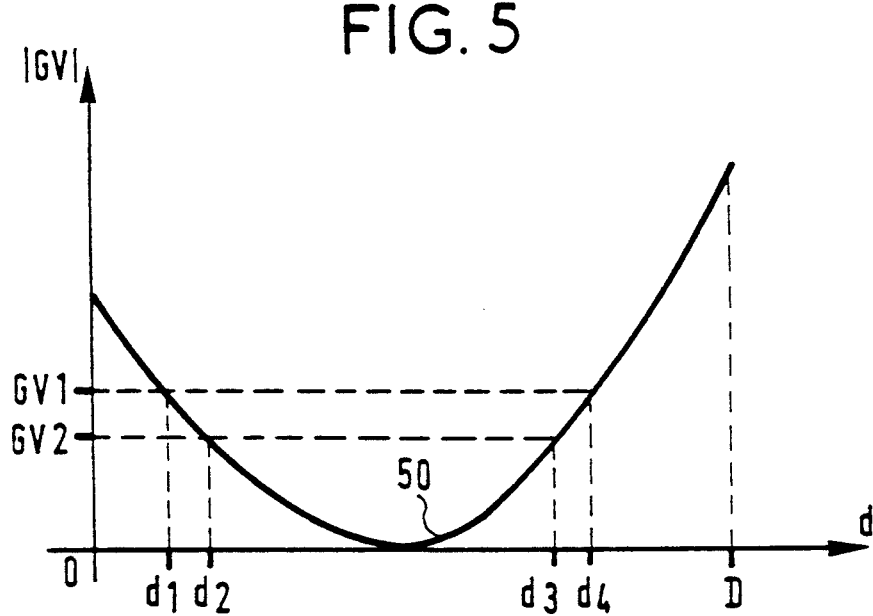
FIG. 5 shows the modulus of the speed gradient of the material as a function of distance from the conductor to be insulated.

The graph 50 of FIG. 5 illustrates the absolute value of the speed gradient as a function of distance from the electric conductor 26.

It is noted that, near to the electric conductor 26, in a zone of width d1, corresponding to one of the surface structures of the insulator, the speed gradient GV is high and greater than a gradient GV1. Accordingly the material of low molecular weight (high viscosity index) is thus located mainly in this zone. The same applies to the zone between d4 and D, i.e. at the outside of the cable emerging from the extruder. This zone corresponds to the other surface structure of the insulator.

In contrast, in the region between d2 and d3, corresponding to the internal structure of the insulator, the speed gradient is low (less than a gradient GV2) and the material of high viscosity, i.e. of high molecular weight, locates there.

Figure 6:
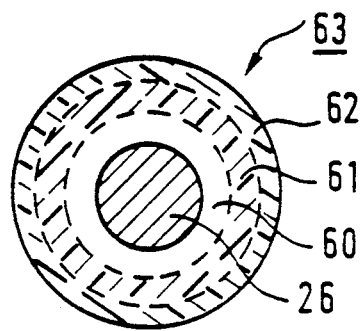
FIG. 6 is a cross-section of a cable provided with an insulator of the invention.

FIG. 6 shows a cross-section of a cable obtained with such a mixture of polymers.

A cable 63 comprises a central electric conductor 26 insulated by material formed from two polymers of different molecular weights.

The insulating material exhibits the form of a tube composed of three successive zones. These zones have been shown by broken lines to indicate that there is no abrupt change in the molecular weight, but that there is a continuous change of molecular weight, i.e. of the viscosity index. The zones illustrated can however be called layers for convenience of explanation. Thus a first inner layer 60 has a low molecular weight relative to that of an intermediate layer 61. An outer layer 62 of low molecular weight covers the layer 61 of high molecular weight. The layers 60 and 62 form the surface structure of the insulator while the layer 61 forms the internal structure of the insulator.

An electric cable of this type thus comprises an electric insulator of a material having a gradient in its molecular weight.

Such a cable has a greater dielectric strength than existing cables, since the layers 60 and 62 have a low molecular weight. Thus it is at the insulator-electrode interfaces creating an electric field that the electric fields are greatest. There is thus a dielectric reinforcement in the parts of the insulator which are the most highly stressed, since these zones are the most organized.

Moreover, since the intermediate layer 61 has a low viscosity index when the cable emerges from the extruder, a good quality of shape of the insulator is obtained with good centering of the conductor in the insulator body.

The present invention thus allows good dielectric strength of the insulating material and a good quality of shape of the cable to be obtained simultaneously.

More generally, it is possible to form a mixture of several polymers with differing viscosity indices. These polymers will then redistribute in the resulting insulator in such a way that the internal structure of the insulator mainly comprises the polymer with the lowest viscosity index and the surface structure of the insulator mainly comprises the polymer with the highest viscosity index. The dielectric reinforcement of the insulator is thus effected gradually.

Figure 7:
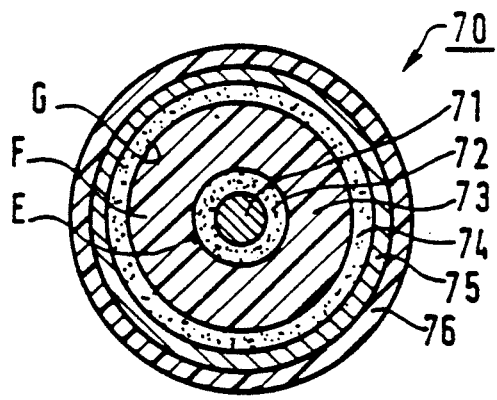
FIG. 7 is a transverse section of another cable provided with an insulator of the invention.

An electric cable obtained by the method of the invention can equally comprise other materials, for example semiconductor screens in contact with different electrodes. Such a cable is shown in FIG. 7.

A cable 70 comprises in succession, from the inside to the outside, a conductive wire 71, a first layer 72 of semiconductor material, an insulator 73 obtained by the method of the invention, a second layer 74 of semiconductor material, a second layer 75 of conductive material, for example aluminum, and finally an insulating layer 76 forming the outer surface of the cable 70.

The function of the semiconductor layers 72 and 74 is to redistribute the electric potentials homogeneously at the interfaces with the insulator 73. The conductive wire 71 transmits an electric current, the return being by way of the layer 75.

At the interface denoted E, corresponding to the contact between the first semiconductor layer 72 and the insulator 73, and at the interface denoted G, corresponding to the contact between the second semiconductor layer 74 and the insulator 73, the dielectric strength of the insulator 73 is maximal, while in the middle of the insulating layer 73 (zone F), the viscous polymer (in the fused state) ensures mechanical strength of the insulator and thus a good quality of shape of the cable 70.

Such a cable is formed with the aid of serial extruders, the layers 72 to 76 being deposited in succession according to a known method. The interfaces E and G form the surface structures, while the zone F corresponds to the internal structure.

According to a preferred embodiment of the invention, the polymers which are mixed have the same chemical nature, i.e. they are composed of the same molecules. A mixture of polymers of the same chemical nature enable the insulator to be made especially easily, since the chemical compatibility of the materials avoids problems at the interfaces.

This polymer may be polyethylene for example or a copolymer of polyethylene. It is likewise possible to use an ethylene-propylene rubber (EPR) or a ter-polymer of ethylene-propylene-diene (EPDM). The greater the number of monomers of the chain forming one of the two polymers, the greater the viscosity of the fused polymer at the outlet of the extruder and the less the organization.

Another advantage of the present invention is that the presence in the die of a fluid polymer in the region of the inner surface 30 of the die (point B, FIG. 3), lubricates the system. Since the material is fluid in this region, friction against the inner surface 30 of the die is reduced and self-heating of the polymer is restricted. In the state of the art it is necessary to limit the drawing speed of the electric wire in order not to reach temperature values which are too high, since excessive heating can lead to decomposition of the insulator. With the method of the invention, this friction is reduced and it is thus possible to increase the speed of manufacture of such an electric cable.

The invention is applicable to any type of electric cable, especially to high tension cables, with which the electric field between the central conductor and a current return conductor is very high.

The electric insulator of a conductor can for example be obtained with a mixture of 10% polyethylene with a viscosity index greater than 5 and 90% polyethylene with a viscosity index between 0.2 and 2.

The polymers used for making insulators for electric conductors are generally of low density type and it is advantageous to use polyethylenes whose melt flow indices (MFI) are very different and are from 0.05 to 10. In the case of a mixture of two polyethylenes, one of these polyethylenes has for example a melt flow index from 0.05 to 0.1 while the other polyethylene has a melt flow index from 3 to 5. In a general manner, the greater the difference in the fluidity, the greater the redistribution of the polymers. In practice, it is desirable for the ratio of the melt flow indices to be from 3 to 100, preferably from 10 to 30.

If more than two polymers are mixed, the ratio of the highest melt flow index to the lowest melt flow index is likewise from 3 to 100, preferably from 10 to 30.

The proportions of the polymers are such that the average melt flow index is in the region from 0.05 to 5 and preferably from 0.2 to 2. An average melt flow index from 0.2 to 2 allows easy extrusion of the insulator on to an electric conductor. The average melt flow index corresponds to the sum of the products of the melt flow indices and of the proportions of each polymer. For example, a mixture of 90% by weight of a first polymer with a melt flow index of 0.2 and 10% by weight of a second polymer with a melt flow index of 10 corresponds to an average melt flow index substantially equal to 1.1.

This calculation of the average melt flow index applies equally when more than two polymers are mixed.

The mixture of polymer material can equally be effected with the aid of an extruder having several inlets, each inlet being assigned to feeding in one polymer material.

Figure 8:
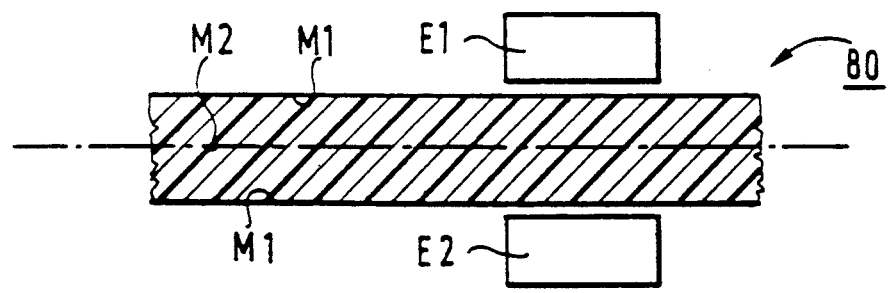
FIG. 8 is a longitudinal section of a sheet of insulating material of the invention.

Obviously the present invention is not limited to the insulation of electric cables and applies whenever it is desired to insulate one electrode effectively from another. An insulator of the invention may then be in the form of a sheet (flat layer), as is shown in FIG. 8.

An insulating sheet 80 of polymer material is interposed between two electrodes E1 and E2. The sheet 80 has a structure composed of several polymer layers. The molecular weight of these polymers increases from the internal layers to the external layers. Such an insulating sheet may be used for example in electric motors to ensure isolation of the windings. It may be applied to the insulation of the electrodes of capacitors.

A sheet of this type is advantageously molded on to an electrode to be insulated. Its manufacture can be effected by extrusion, injection on molding. These three methods enable the material to be organized. The range of polymers may be greater than that for the manufacture of cables and ABS or polyamides may be used for example.

During manufacture by injection or molding, the ratio of the melt flow index of the most fluid polymer to the melt flow index of the most viscous polymer is advantageously likewise from 3 to 100 and preferably between 10 and 30. In contrast the average melt flow index may be higher and from 5 to 8.

In the case of manufacture by injection of a body composed of the material of the invention, the polymer under pressure is admitted to a mold. The redistribution of the polymers is effected in part in the fused polymer inlet duct into the mold and in part in the mold. In such an inlet duct, the polymer also adheres to the internal walls of the duct, where there is a natural redistribution of the polymers of differing viscosities. Moreover, in the mold such a redistribution of polymers is also observed, on account of the imposed pressure. Obviously the speed gradient can have a more complex form that that shown in FIG. 5, depending on the shape of the body to be made and the shape of the inlet duct.

The bodies which are obtained then have a structure reinforced more and more from the interior towards the exterior. The product whose molecular weight is highest is mostly in the interior. It is thus possible to make complex shapes by injection molding, for example insulating boxes for connectors.

Insulating polymers of the invention may equally be obtained by simple molding, for example by compression of the fused material. The redistribution of the polymers is then effected in the same manner, this redistribution taking place in the mold because of the molding pressure exerted.

Figure 9:
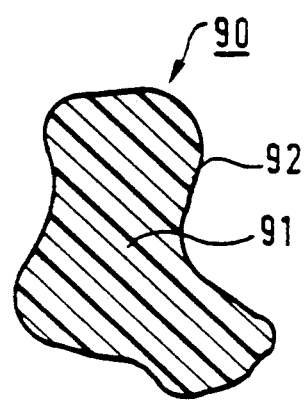
FIG. 9 is a section of a body obtained by injecting a mixture of materials of different molecular weights.

A body obtained by injection or molding is shown in FIG. 9. In this section, a body 90 has an internal structure 91, forming the core of the body, of high molecular weight, and a surface structure 92 of low molecular weight. The surface structure 92 can be like a closed surface of small thickness.

In general, the core of the insulating material of the invention has a high molecular weight while the edges of the material have a lower molecular weight.

The injection and the molding of polymer material of differing molecular weights thus allow insulating bodies of complex form to be made, exhibiting simultaneously good geometry and a high dielectric strength.

Another advantage of the invention is that the insulator which is obtained has a laminated structure. There is thus a progressive reinforcement from the interior towards the exterior and better insulation, especially for direct current.

According to another manner of implementing the invention, the heated material to which a stress is applied to enable structuring is obtained by synthesis. This material then has two distinct peaks in the molecular concentration, as shown in FIG. 10.

Figure 10:
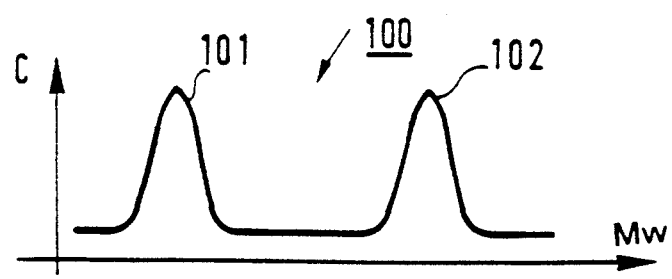
FIG. 10 shows the molecular concentrations of a synthetic material which can be used in the present invention.

FIG. 10 shows the molecular concentrations of a material obtained by synthesis which can be used in the present invention. The molecular weight is shown as abscissa and the molecular concentration C in the synthesis as ordinate.

The graph 100 of molecular concentration has a first peak 101 of low molecular weight relative to that of a second peak 102 of higher molecular weight. A synthetic material of this type thus has a characteristic of the concentration of molecular weight having the same form as that of a mixture of two polymer of differing molecular weights. The material can be obtained by introducing an additive during the polymerization stage. This addition can be made at several instants during the polymerization of the monomer. This operation has the result of modifying the kinetics of the polymerization and leads to a redistribution of the molecular weight with several maxima.

We claim:

1. A method of preparing an electrically insulating body, comprising;

heating a mixture of at least a first polymeric material and a second polymeric material, said first polymeric material having a higher molecular weight and a lower melt flow index than said second polymeric material; and applying a stress to the heated mixture so as to form an electrically insulating body having an internal structure formed primarily by the first polymeric material and a surface structure formed primarily by the second polymeric material, the proportion in said body of said first polymer material relative to said second polymer material being reduced progressively from said internal structure towards said surface structure.

2. A method according to claim 1, wherein the ratio of the melt flow indices of the first and second polymeric materials is between 3 and 100.

3. A method according to claim 2, wherein the ratio is between 10 and 30.

4. A method according to claim 1, wherein said first polymeric material and said second polymeric material comprise distinct molecular weight fraction of a single synthetic polymeric material.

5. A method according to claim 1, wherein said first and second polymeric materials are selected from the group consisting of ethylene homopolymers and copolymers.

6. A method according to claim 1, wherein said applying step comprises extruding the heated mixture.

7. A method according to claim 6, wherein the heated mixture is extruded through a die while drawing an electrical conductor to be coated therethrough, thereby forming an insulating coating for said electrical conductor.

8. A method according to claim 7, wherein the average melt flow index of the mixture is between 0.05 and 5.

9. A method according to claim 8, wherein the average melt flow index of the mixture is between 0.2 and 2.

10. A method according to claim 1, wherein said applying step comprises forming a sheet of the heated mixture by injection or molding.

11. A method according to claim 10, wherein the average melt flow index of the mixture is between 5 and 8.

* * * * *